United States Patent [19]

Webb

[11] Patent Number: 5,033,637

[45] Date of Patent: Jul. 23, 1991

[54] SYSTEM FOR STORING WASTE FLUIDS

[75] Inventor: R. Michael Webb, Eau Claire, Wis.

[73] Assignee: U-Fuel, Inc., Eau Claire, Wis.

[21] Appl. No.: 571,302

[22] Filed: Aug. 22, 1990

[51] Int. Cl.⁵ ............................................ B65D 81/36
[52] U.S. Cl. .................................... 220/565; 220/571;
    220/85 F; 220/86.1; 141/98; 141/364; 141/339
[58] Field of Search ....................... 220/571, 573, 86.1,
    220/86.2, 85 F, 371, 373, 361, 565; 141/98, 363,
    364, 339

[56]  References Cited
   U.S. PATENT DOCUMENTS

| | | | |
|---|---|---|---|
| 1,554,589 | 9/1925 | Long . | |
| 1,994,158 | 3/1935 | Wiswell | 141/364 |
| 2,781,065 | 2/1957 | Hofacer | 141/364 |
| 3,354,989 | 11/1967 | Anderson . | |
| 3,410,438 | 11/1968 | Bartz . | |
| 3,934,623 | 1/1976 | Hays | 141/364 |
| 4,054,184 | 10/1977 | Marcinko . | |
| 4,114,644 | 9/1978 | Piper | 220/573 |
| 4,301,841 | 11/1981 | Sandow . | |
| 4,403,692 | 9/1983 | Pollacco . | |
| 4,488,584 | 12/1984 | Hestehave et al. | 220/573 |
| 4,533,042 | 8/1985 | Pollacco . | |
| 4,557,395 | 12/1985 | DeLay, Jr. . | |
| 4,638,841 | 1/1987 | Heath | 141/339 |
| 4,733,790 | 3/1988 | Stein | 220/571 |
| 4,802,599 | 2/1989 | Hill . | |
| 4,809,866 | 3/1989 | Crocker . | |
| 4,823,947 | 4/1989 | Maynard, Jr. . | |
| 4,856,568 | 8/1989 | Murphy et al. . | |
| 4,974,647 | 12/1990 | Eastom | 141/98 |

Primary Examiner—Joseph Man-Fu Moy
Attorney, Agent, or Firm—Merchant, Gould, Smith, Edell, Welter & Schmidt

[57]  ABSTRACT

A system for storing waste fluids such as engine oil in bulk, which can be situated at a service station or other centralized waste storage facility. The system is charactrized by a relatively large tank having an access opening which is surrounded by a receptacle. A removable grate is provided within the receptacle over the access opening, so that articles such as oil filters may be placed in the receptacle for draining. The tank is supported relative to the ground or other flat surface by a pedestal. The system is an integral unit which may be deployed by a crane or other lifting mechanism to a desired location.

11 Claims, 2 Drawing Sheets

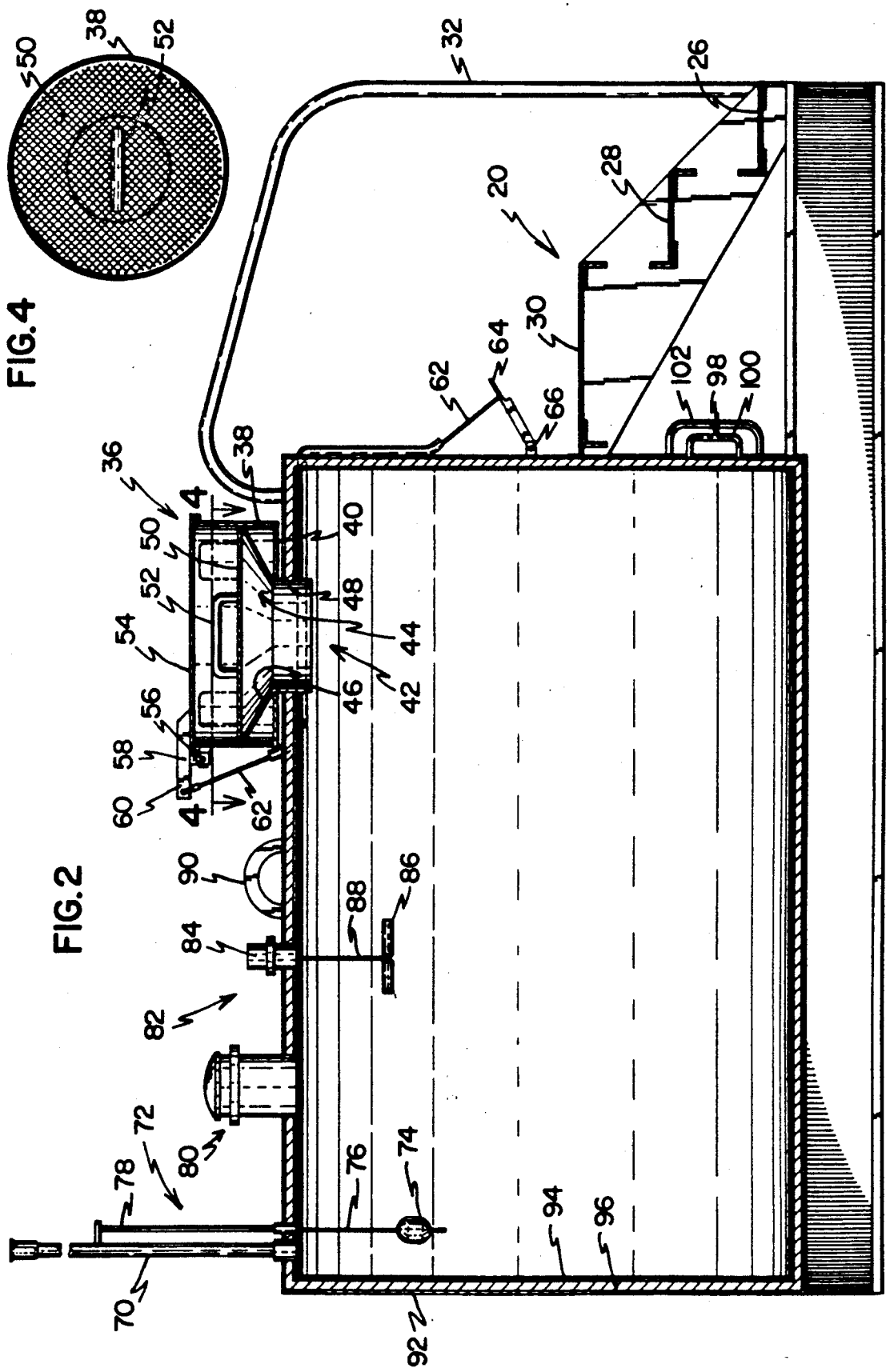

SYSTEM FOR STORING WASTE FLUIDS

BACKGROUND OF THE INVENTION

1. Field of the Invention

This invention relates to systems and methods which are used to dispose or recycle toxic waste in an environmentally responsible manner. More particularly, this invention relates to a system for storing waste fluids in bulk, which may be situated at a service station or like establishment.

2. Description of the Prior Art

An impressive volume of fluid waste is created by our contemporary industrialized society each year. The automotive industry accounts for a large portion of this waste. Engines and powered systems in automotive vehicles typically utilize fluids which need to be changed periodically in order to minimize wear on the vehicle. For example, most passenger automobiles have engines which require 4-6 quarts of motor oil which needs to be changed every 3,000-5,000 miles. Nationally, the amount of waste engine oil that needs to be disposed of or recycled is tremendous.

Historically, waste engine oil has been disposed of in dumps or undeveloped areas, which in some cases has resulted in contamination of underlying ground water or other environmental damage. To combat this, some states and municipalities have passed or are considering legislation to require that waste oil be brought to centralized locations such as service stations for holding and eventual recycling. In many cases though, compliance with such statutes has been disappointing because service stations often lack proper facilities for holding waste engine oil. Particularly, many service stations tend to discourage persons who change their own oil from using these service stations' limited storage facilities.

Another problem with such facilities is that they typically are unable to recover waste engine oil which is trapped within the oil filter taken from the vehicle. Used oil filters are commonly disposed and sent to a dump or landfill, where the oil therein can leak and contaminate the ground water.

It is clear that there has existed a long and unfilled need in the art for a system for storing waste fluids such as waste engine oil in bulk. A need also exists for a system which is capable of recovering the waste engine oil that is trapped in an oil filter after it is removed from an engine.

SUMMARY OF THE INVENTION

Accordingly, it is an object of the invention to provide a system for storing waste fluids such as engine oil in bulk.

It is further an object of the invention to provide a system which may be conveniently situated as a single module at a service station or like establishment.

It is yet further an object of the invention to provide a system for storing waste fluids in bulk which is capable of recovering waste fluids from objects such as filters.

In order to achieve those and other objects of the invention, a system for storing waste fluids in bulk according to the invention includes a tank having an access opening defined therein; a pedestal beneath the tank for supporting the tank on a flat horizontal surface; a receptacle on the tank surrounding the access opening; and a removable grate provided within the receptacle over the access opening, the grate being adapted for supporting at least one inverted oil filter, whereby waste oil can be drained from the filter.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 2 is a longitudinal cross-sectional view through a system constructed according to FIG. 1;

FIG. 4 is a cross-sectional view taken along lines 4—4 in FIG. 2.

DETAILED DESCRIPTION OF THE PREFERRED EMBODIMENT(S)

Figure 1:
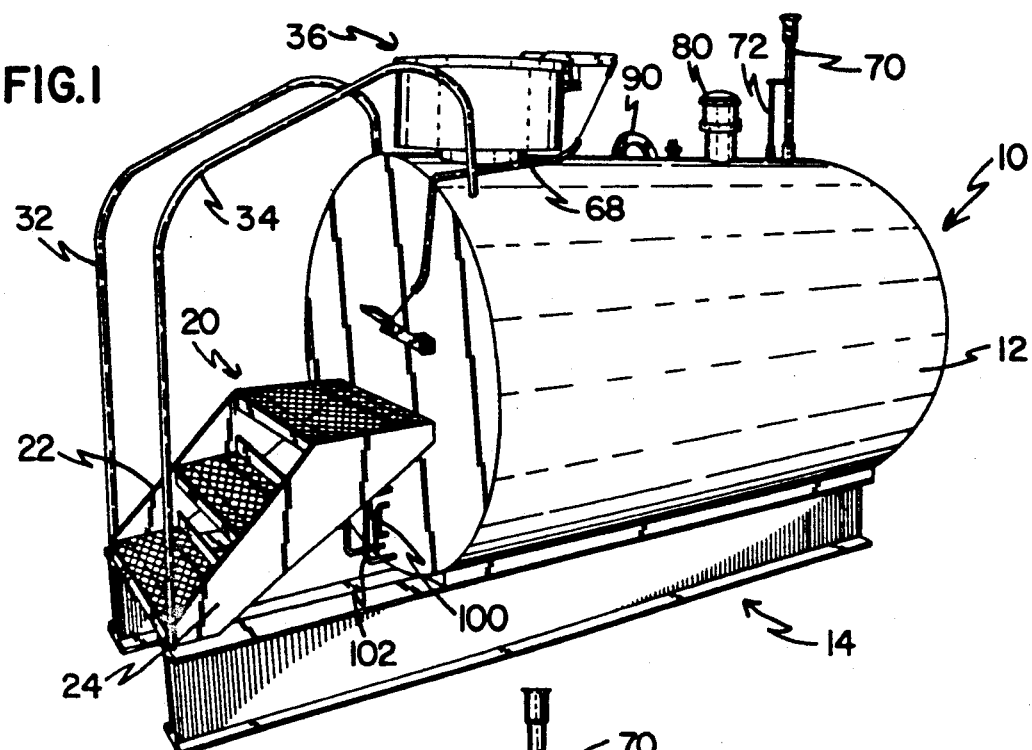
FIG. 1 is a perspective view of a system for storing waste fluids according to a preferred embodiment of the invention.
Figure 3:
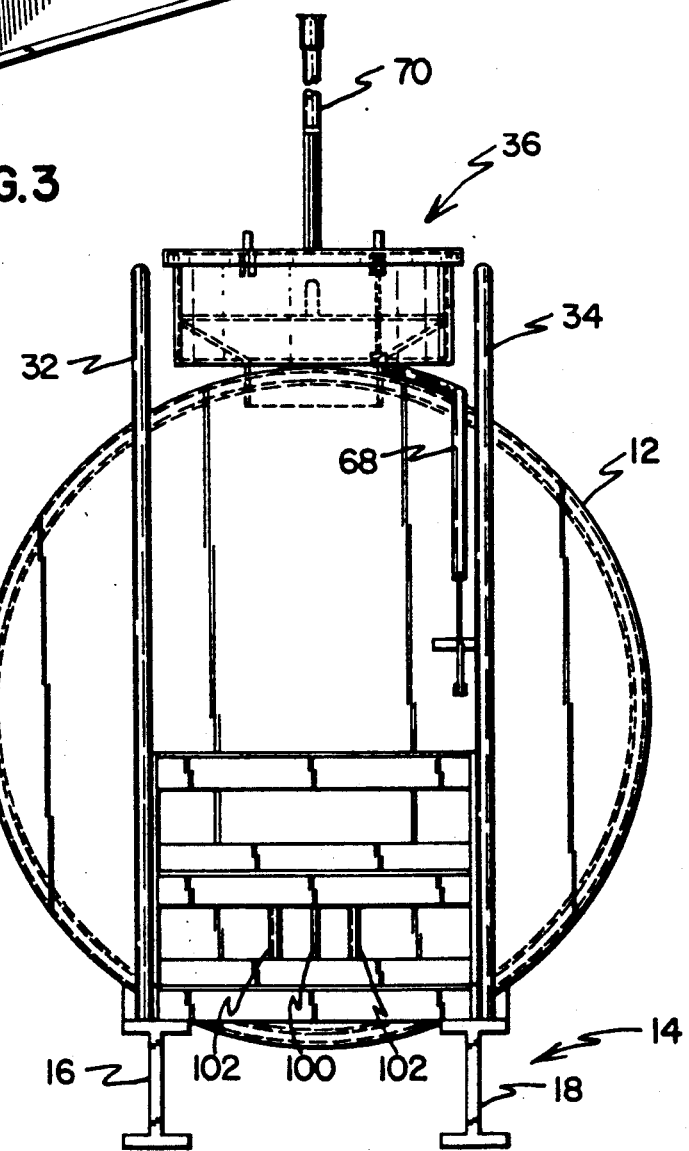
FIG. 3 is a side elevational view of a system constructed according to the embodiment of FIGS. 1 and 2.

Referring now to the drawings, wherein like reference numerals designate corresponding structure throughout the views, and referring in particular to FIG. 1, a system 10 for storing waste fluids according to a preferred embodiment of the invention includes a cylindrical tank 12 that is supported relative to the ground or other flat horizontal surface by a pedestal 14. As may be seen in FIG. 3, in the preferred embodiment pedestal 14 consists of a first elongate metallic skid member 16 and a second elongate metallic skid member 18. The bottom of tank 12 is welded to or otherwise connected to an upper surface of each of the skid members 16, 18.

Referring again to FIG. 1, a step unit 20 for providing an operator a place to stand during servicing of the system 10 is provided adjacent tank 12 and is supported by the pedestal 14. As may be seen in FIGS. 1, 2 and 3, step unit 20 includes a first side member 22 and a second side member 24, both of which have lower portions which are connected to an upper surface of the respective skid members 16, 18. Side members 22, 24 extend upwardly and substantially parallel to each other, and have upper ends which are connected to a side wall portion of the tank 12. A first step 26, second step 28 and third step 30 are horizontally mounted between the first and second side members 22, 24. A first hand rail 32 and a second hand rail 34 are provided on each side of step unit 20 for protecting an operator against injury during servicing of the system 10. Both of the hand rails 32, 34 have a lower end connected to an upper portion of the respective skid members 16, 18 and an upper end welded to a cylindrical surface of the tank 12.

As is best shown in FIG. 2, a receptacle 36 is securely mounted to an upper surface of tank 12. Receptacle 36 may be substantially cylindrical, having an outer side wall 38 and a bottom wall 40. As may be seen in FIG. 2, bottom wall 40 has an opening defined therein which is in communication with an access opening 42 that is defined in the upper surface of tank 12. Receptacle 36 has a funnel portion 44 formed integrally therein, as may also be seen in FIG. 2. Funnel portion 44 defines a conical funnel surface 46 which extends downwardly and radially inwardly from an inside surface of side wall 38 to a cylindrical funnel surface 48 which extends downwardly through access opening 42 into tank 12.

As can best be seen in FIGS. 2 and 4, a circular metal grate 50 is supported by an upper portion of the conical funnel surface 46. Grate 50 has an inverted U-shaped handle 52 formed thereon for gripping by an operator. The mesh size of grate 50 is large enough to permit waste fluids such as engine oil to freely flow therethrough, but is fine enough to support an object such as inverted oil filter. Grate 50 rests freely within receptacle 36, and may be removed by an operator by gripping handle 52 and lifting grate 50 out of receptacle 36. Referring again to FIG. 2, receptacle 36 further includes a lid member 54 which is hingedly mounted to side wall 38 about a pivot point 56 by a hinge 58 to selectively cover or uncover an upper opening defined by upper edges of side wall 38. Hinge 58 has a lever arm 60 formed integrally therewith, as is best shown in FIG. 2. A table 62 is connected to a distal end of lever arm 60 and extends downwardly through a sheath 68 to a foot pedal 64 which is connected to a side wall of tank 12 by a hinge 66. Foot pedal 64 and hinge 66 are mounted on the side of tank 12 in a position which is just above the uppermost third step 30 of the step unit 20. As a result, an operator who wishes to gain access to receptacle 36 can stand on the third step 30 and use one foot to depress pedal 64 while stabilizing his or her self by gripping one or both of the hand rails 32-34. When access is not desired, lid member 54 automatically returns to its closed position. This prevents vapors from escaping from tank 12, and allows the system 10 to be placed outdoors, since rainwater is prevented from entering tank 12 by the lid member 54.

Referring now to FIGS. 1 and 2, system 10 further includes a pressure/vacuum vent 70 which is in communication with the space defined within tank 12. Preferably, pressure/vacuum vent 70 is set to open when pressure within tank 12 exceeds 8 ounces per square inch positive pressure or ½ ounce per square inch negative or vacuum pressure. In this way, the tank 12 is safely and adequately ventilated without the loss of vapors during normal operating conditions.

One novel aspect of the system 10 is the provision of a fill indicator 72, which indicates when the tank 12 is reaching its capacity and needs to be emptied. Fill indicator 72 includes a float 74 which is positioned within the tank 12 and is connected to a rod 76. Rod 76 extends through the wall of tank 12 into a transparent tube 78 which is positioned on the upper surface of tank 12. By viewing the position of rod 76 within tube 78, an operator can determine when the tank 12 needs to be emptied. It is to be understood, however, that alternate fill indicators or alarms are equally within the scope of the invention.

An emergency vent 80 is also mounted to the upper surface of tank 12. Emergency vent 80 is of conventional structure on fuel type tanks, and is designed to allow vapors to escape and possibly burn in the event of a catastrophic fire.

A volume gauge 82 is further mounted to the upper surface of tank 12. Volume gauge 82 includes a gauge body 84 which is mounted within the wall of tank 12 and has a retractable cable 88 which extends within the tank 12 and is connected to a float 86. An indicator on gauge body 84, which may be calibrated in terms of volume, indicates the amount of cable 88 that has been played out. Float 86 rises or falls depending upon the level of waste fluids which are contained in the tank. As a result, the volume of oil in the tank can be measured, from an almost empty to a completely full state. The specific structure of volume gauge 82 is conventional and known in the art. The purpose of volume gauge 82 is to measure how much oil is in the tank; the purpose of fill indicator 72 is to warn the operator when the tank is reaching its capacity to hold waste fluid.

One of the benefits of a system constructed according to the invention is that is deployable as a single unit in a location such as a maintenance center or service station. To this end, a lifting lug 90 is securely welded or otherwise attached to the top of tank 12. Lifting lug 90 may be engaged by a crane or other type of powered lift mechanism to place the system in a desired location.

Referring again to FIG. 2, another novel aspect of the invention is the provision of an insulated, double-walled tank 12 which is resistant to leaks or fire-related damage. Tank 12 includes an outer wall 92, an inner wall 94 and preferably has a thermal insulation material 96 provided in the space between outer wall 92 and inner wall 94. Insulation material 96 preferably is Kaowoll 2300 ceramic fiber blanket, but may also be formed of other similar fire-retardant materials. To sense whether oil is leaking through the inner wall 94, an interstitial gauge 98 includes a transparent tube 100 which extends through outer wall 92 into communication with the space between outer wall 92 and inner wall 94. If a leak occurs in inner wall 94, the thermal insulation material 96 will become saturated with waste fluid, and the fluid will become visible in the transparent tube 100. In order to protect transparent tube 100 from accidental damage, a pair of side guards 102 are provided. To enable the system 10 to store waste fluids in bulk, tank 12 is preferably fairly large. In one preferred embodiment, tank 12 has a diameter of approximately 4 feet and an axial length of about 6 feet.

In operation, a service station attendant or other operator carries a small container of waste fluid such as engine oil up the step unit 20, depresses the foot pedal 64, thus causing lid member 54 to expose the opening of receptacle 36. The waste oil may then be poured through grate 50 into the funnel portion 44 of receptacle 36, where it drains into the tank 12. Alternatively, an operator may need to drain waste fluid such as oil out of an oil filter other object which contains waste fluid. If this is the case, the objects are inverted and placed on the upper surface of grate 50 for draining. Sufficient space is provided between grate 50 and lid member 54 to allow lid member 54 to close when such objects are draining.

When, in the course of normal use, the tank 12 begins to fill, the volume of waste fluids contained therein may be monitored by an operator by observing the readout on volume gauge 82. When tank 12 begins to reach its capacity, the fill indicator 72 will bring this condition to the attention of the operator. The operator may then call a commercial waste recovery service, which will remove grate 50 from receptacle 36 by gripping the handle 52 and pulling the grate 50 upwardly. A hose may then be extended into tank 12 for withdrawing the waste fluid. After this is done, the grate 50 may be repositioned within receptacle 36, and system 10 will again be operative for storing waste fluids.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A system for storing waste fluids in bulk, which may be situated at a service station or like establishment, comprising:
    a tank having an access opening defined therein;
    a stationary pedestal beneath said tank for supporting said tank on a flat, horizontal surface;
    an upstanding receptacle on top of said tank surrounding said access opening, said receptacle including at least one side wall defining an upper opening, and a lid member hingedly mounted to said side wall for covering said upper opening; and
    a removable grate provided within said receptacle over said access opening, said grate being adapted for supporting at least one inverted oil filter, whereby waste oil can be drained from the filter.

2. A system according to claim 1, further comprising step means adjacent said tank for providing an operator a place to stand during servicing of said receptacle.

3. A system according to claim 2, wherein said step means is supported by said pedestal.

4. A system according to claim 1, wherein said tank comprises an outer wall, an inner wall and thermal insulation material provided in a space between said outer wall and said inner wall.

5. A system according to claim 4, further comprising means for indicating whether fluid has leaked in to said space between said inner wall and said outer wall.

6. A system according to claim 1, wherein said pedestal comprises a pair of elongate metallic skid members.

7. A system according to claim 1, wherein said receptacle includes a funnel surface for guiding fluid into said access opening.

8. A system according to claim 1, further comprising means for selectively lifting said lid towards an open position.

9. A system according to claim 8, wherein said lid lifting means includes a manually depressible foot pedal.

10. A system according to claim 1, further comprising means for indicating when said tank has become filled to a predetermined level, whereby an operator will know that it is time to empty the tank.

11. A system according to claim 1, wherein said tank includes at least one lifting lug on an upper surface thereof.

* * * * *